United States Patent Office 3,397,990
Patented Aug. 20, 1968

3,397,990
HEXAMETHONIUM SALTS AS GROWTH PROMOTERS IN ANIMAL FEED COMPOSITIONS
Francis A. Hochstein, New London, Conn., assignor to Chas. Pfizer & Co., Inc., New York, N.Y., a corporation of Delaware
No Drawing. Filed Jan. 30, 1964, Ser. No. 341,407
7 Claims. (Cl. 99—2)

ABSTRACT OF THE DISCLOSURE

Compositions for increasing the growth and feed efficiency of quadruped animals, both ruminant and non-ruminant, comprising nutritionally balanced animal feeds containing minor proportions of non-toxic hexamethonium salts of the formula $[(CH_3)_3N—(CH_2)_6—N(CH_3)_3]^{+2}Z$ wherein Z is a non-toxic anion and is present in sufficient molar proportion to satisfy electroneutrality.

---

This invention relates to novel and highly useful animal feeds and to a method for promoting the growth of animals. More particularly, it is concerned with nutritionally balanced animal feeds which contain minor proportions of the non-toxic hexamethonium salts.

Considerable research has been devoted in recent years to the development of animal feeds useful for stimulating the growth and improving the feed efficiency of animals, in particular, of domestic animals. Thus, such animals are able to attain market size sooner and on much less feed. The economic value of such feeds is obvious.

In accordance with the prior art, a wide variety of chemicals such as antibiotics, hormones and chemotherapeutic agents, are useful for improving the growth rate and feed efficiency of animals. Penicillin, bacitracin, tetracyclines, hydrocortisone, cortisone, prednisolone, prednisone, 9-fluorohydrocortisone, 9-fluorocortisone, stilbestrol and gibberellins are among the commonly used growth stimulants.

It has now been found that the addition of a low level of a non-toxic hexamethonium salt to the diet of quadruped animals, both ruminant and non-ruminant, such that these animals receive the product over an extended period of time, especially over a major portion of their active growth period, results in an acceleration of the rate of growth and improved feed efficiency. Included in these two classes of quadrupeds are cattle, sheep, dogs, cats, swine, rats, mice, horses, goats, mules, rabbits, mink, etc. The beneficial effects in growth rate and feed efficiency are over and above what is normally obtained with complete nutritious diets containing all the nutrients, vitamins, minerals and other factors known to be required for the maximum healthy growth of such animals.

The hexamethonium salts, operative in this invention have the formula

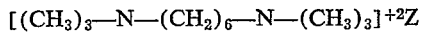

$$[(CH_3)_3—N—(CH_2)_6—N—(CH_3)_3]^{+2}Z$$

wherein Z is a non-toxic anion and is present in sufficient molar proportion to satisfy electroneutrality. Z may be selected from the group consisting of chloride, bromide, iodide, formate, gluconate, pamoate (1,1'-methylene bis-2-hydroxy-3-naphthoate), amsonate (4,4'-diaminostilbene-2,2'-disulfonate), monovalent and divalent anions of maleic, fumaric, sulfuric and phosphoric acids, hydrocarbon mono and polycarboxylic acids, having from 2 to 6 carbon atoms such as acetic, propionic, butyric, isobutyric, valeric, isovaleric, caproic, oxalic, malonic, succinic, glutaric and adipic acids and hydroxy-substituted hydrocarbon polycarboxylic acids having from 3 to 6 carbon atoms such as malic, tartronic, α-hydroxyglutaric, tartaric and citric acids. When Z represents a monovalent anion two Z groups will, of course, be required to maintain electroneutrality. When Z is a divalent anion only 1 of said anions will be required.

The preparation of many of these salts is described by Barber et al., J. Pharm. and Pharmacol., 3, 663 (1951). The above salts not described therein are prepared by substantially the same methods.

Additionally, hexamethonium resinates or resin adsorbates, in which Z represents the resin matrix, may also be used to advantage particularly where blending or mixing of the hexamethonium salt with the feed or feed concentrate is a problem. Resin adsorbates formed with the strong sulfonic acid polystyrene type cation exchange resins such as Amberlite IR-120 and Dowex-50 (available from Rohm & Haas Company and the Dow Chemical Company) or with the weak cation exchange resins of the carboxylic-polymethacrylic type, such as Amberlite IRC-50, or of the carboxylic-polyacrylic type such as Amberlite XE-89 (available from Rohm & Haas Company) may be used.

The hexamethonium salts may be used in conjunction with various other growth stimulants, therapeutic agents and antibiotics such as hormones, arsenicals, coccidiostats, sulfur, enzymes, oxytetracycline, chlortetracycline, tetracycline, penicillin, bacitracin, oleandomycin, etc.

The feeds used for supplementation with the hexamethonium salts indicated above to form the improved animal feeds of this invention will vary to some extent from species to species depending upon the individual requirements of the animals in question. In general these diets will contain sources of carbohydrates such as grains, various types of flours, meals and other vegetable products, sugars, sugar syrups, hydrolyzed starch, etc. Additionally, the diets will include a source of protein. This material may be derived from vegetable sources such as soy beans, peanuts, corn, and other similar materials, but in this case it may be necessary to supplement this source of protein with vitamin $B_{12}$. Other sources of protein from animal products may also be used and in this case supplementation with the vitamin may not be necessary. These protein sources include fish meal, meat scraps, tankage, and other materials of this nature. In addition the diet should contain sources of minerals such as calcium carbonate, calcium phosphate, iron, copper, zinc, manganese, magnesium, sodium, potassium, etc. If insufficient vitamins are present in the diet from vegetable and animal sources, then it will be necessary to supplement the diet with sources of vitamins such as A, D, thiamin, riboflavin, pantothenic acid, choline, etc. Diets such as have been recommended by the National Research Council are particularly useful as the standard type of diet for supplementation in accordance with the present invention.

In administering the products of this invention, it is preferred, as indicated above, to incorporate these materials in a balanced animal diet. However, equally beneficial effects in growth rate and feed efficiency are obtained by simply adding the hexamethonium salt to the animals' drinking water or, where appropriate, to salt licks, or by direct oral administration.

In general it is preferred to use the hexamethonium salts at a concentration of at least about 20 mg. of the salt per kg. of the total feed supplied the animal. In some cases, a somewhat higher level is useful with a particular species of animal or when a particular salt is used. A range of from about 20 mg./kg. to about 500 mg./kg. of feed, corresponding to about 0.002% to about 0.05% (w./w.), or about 18 g. to about 500 g./ton of feed, seems to be effective in producing the beneficial effects. Higher concentrations can be used but appear to offer no advantages. If it is desired to administer the hexamethonium salt by some other route than in the animal's feed, for instance, in drinking water or by direct administration in the form of tablets or by other routes, a level of from about 1.0 mg./kg. to about 35 mg./kg. of animal weight should be used.

The beneficial effects observed appear to be attributable to the hexamethonium moiety itself. The anion or anions associated with said moiety appear to be of no great significance as regards the observed results. The choice of one salt over another is therefore determined mainly by their relative availability, their stability and their physical characteristics. The chloride and bromide are favored salts by reason of their availability.

It should be noted that within the purview of this invention it is contemplated that not only a given hexamethonium salt, e.g. the chloride or bromide, may be used alone in a nutritionally balanced animal feed; but also that a mixture of two or more hexamethonium salts, e.g. the chloride and bromide, the chloride and iodide or the chloride, bromide and pamoate may be used. In general, however, it is preferred to use a given salt rather than a mixture of two or more salts for the sake of convenience.

The herein described feeds of this invention have been found to be particularly valuable and outstanding in the case of such animals as rats, hogs, swine, lambs, cattle, and the like. In some instances the degree of response may vary with respect to the sex of the animals. The hexamethonium salts may, of course, be administered in one component of the feed or they may be blended uniformly throughout a mixed feed; alternatively, as noted above, they may be administered in an equivalent amount via the animal's water ration. It should be noted that a variety of feed components may be of use in the nutritionally balanced feeds.

The resulting new feed compositions have marked effects on the rate of growth and feed efficiency. Feed efficiency may be defined as the number of pounds of feed required to produce a pound gain in weight. Increased feed efficiency is an extremely important economic factor in raising animals. simply stated, the compositions of this invention when fed to animals are more efficiently converted to animal body weight than prior art compositions. Any animal feed composition may be prepared to comprise the usual nutritional balance of energy, proteins, minerals, and vitamins together with one or more of the hexamethonium salts described above. Some of the various components are commonly grains such as ground grain, and grain by-products; animal protein substances, such as meat, and fish by-products; vitaminaceous mixtures, e.g. vitamin A and D mixtures, riboflavin supplements and other vitamin B complexes; and bone meal, limestone, and other inorganic compounds to provide minerals.

The relative proportions of the hexamethonium salts in feeds and feed concentrates may vary somewhat, depending upon the salt, the feed with which they are employed and the animal consuming the same. These substances are advantageously combined in such relative proportions with edible carriers to provide concentrates which may readily be blended with standard nutritionally balanced feeds or which may be used themselves as an adjunct to the normal feedings.

A wide variety of carriers may be employed in the preparation of concentrates containing the aforesaid supplements. Suitable carriers include the following: Soybean oil meal, corn gluten meal, cotton seed oil meal, sunflower seed meal, linseed oil meal, cornmeal, limestone and corncob meal. The carrier facilitates uniform distribution of the active materials in the finished feed with which the concentrate is blended. This is especially important because only relatively small proportions of these potent materials are required. The concentrate may be surface coated, if desired, with various proteinaceous materials or edible waxes, such as zein, gelatin, microcrystalline wax and the like to provide a protective film which seals in the active ingredient. It will be appreciated that the proportions of the hexamethonium salt in such concentrates are capable of wide variation since the amount of active materials in the finished feed may be adjusted by blending the appropriate proportion of concentrate with the feed to obtain the desired degree of supplementation. In the preparation of high potency concentrates, i.e. premixes, suitable for blending by feed manufacturers to produce finished feeds or concentrates of lower potency, the hexamethonium salt content may range from about 0.1 g. to 50 g. per pound of concentrate. A particularly useful concentrate is provided by blending 2 gm. of the desired hexamethonium salt, e.g. chloride or bromide, with 1 pound of soybean oil meal or 1 pound of limestone-soybean oil meal (1:1). Other dietary supplements, such as vitamins, minerals, etc., may be added to the concentrates in the appropriate circumstances.

The high potency concentrates may be blended by the feed manufacturer with proteinaceous carriers, such as soybean oil meal, to produce concentrated supplements which are suitable for direct feeding to animals. In such instances, the animals are permitted to consume the usual diet of corn, barley and other fibrous grains and the like. The proportion of the hexamethonium salt in these supplements may vary from about 0.1–10 g. per pound of supplement. In the case of those salts of the above formula which are hygroscopic, e.g. acid adipate, acid maleate, succinate, sulfate, or syrups, e.g. citrate, homogeneous mixtures are conveniently realized by applying said salt to the feed or to a suitable carrier which is subsequently incorporated in the feed, as a spray in the form of a solution in a suitable solvent such as methanol, ethanol or water. When using such salts as the active ingredients, it is preferred to make up a high potency concentrate by spraying a suitable carrier with an alcoholic solution of said salt to provide the desired concentration of active ingredient. From a practical standpoint solutions of from about 5% to the maximum solubility of the salt in the chosen solvent are used to facilitate the drying of the concentrate.

The concentrates described may also be added to animal feeds to produce a nutritionally balanced, finished feed containing from about 18 to about 500 g. of the hexamethonium salt per ton of finished feed. In the case of ruminants, the finished feed should contain protein, fat, fiber, carbohydrate, vitamins and minerals, each in an amount sufficient to meet the nutritional requirements of the animal for which the feed is intended. Most of these substances are present in naturally occurring feed materials, such as alfalfa hay or meal, cracked corn, whole oats, soybean oil meal, corn silage, ground corn cobs, wheat bran, and dried molasses. Bone meal, limestone, iodized salt and trace minerals are frequently added to supply the necessary minerals, and urea to provide additional nitrogen.

As is well known to those skilled in the art, the types of diets are extremely variable depending upon the purpose, type of feeding operation, species, etc. Specific diets for various purposes are listed by Morrison in the appendix of "Feeds and Feeding," The Morrison Publishing Company, Clinton, Iowa, 1959.

In the case of non-ruminant animals, such as hogs, a suitable feed may contain from about 50 to 80% of grains, 3 to 10% animal protein, 5 to 30% vegetable protein, 2 to 4% of minerals, together with supplementary vitaminaceous sources.

Only minor proportions of the hexamethonium salts are required to impart substantial growth-accelerating properties to animal feeds or supplements such as those previously described. When employed in the proportions set forth, these feeds or concentrates will make available to the animal a sufficient amount of the active ingredients to achieve the desired growth acceleration. It should be appreciated that the actual amount of the active ingredient consumed by animals will vary not only with their proportions in the feed or concentrate, but also with the particular animal and its feeding habits. In general, however, the proportions should be so adjusted as to provide the particular animal the quantities of active ingredient indicated herein.

Supplementation of the diet of hogs with non-toxic hexamethonium salts not only produces a superior increase in the rate at which weight is gained but also favorably effects carcass characteristics. Dressing percentage is favorably increased as is the yield of primal cuts. Dressing percentage is highly correlated with backfact thickness. This indicates that at least some of the increase in dressing percentage can be accounted for by increased fat deposition. Backfat measurements, in all cases, are highest with the lower levels of hexamethonium salts. The lower levels of hexamethonium salts also advantageously influence the yields of the primal or most valuable cuts, e.g. ham and loin.

In addition to the hexamethonium salts illustrated herein, related compounds wherein the nitrogens are substituted by groups other than the methyl group also produce beneficial effects on growth rate and feed efficiency. For example, there may be mentioned the homologous polymethylene ammonium salts wherein one or more of the methyl groups attached to nitrogen is replaced by a homologous (lower)alkyl group having up to 6 carbon atoms. Further, those compounds wherein the alkylene group, that is, the moiety bridging the nitrogen atoms has from 2 to 5 methylene groups, also function similarly as feed supplements. Specific examples of such related and similarly useful compounds are N-(1-naphthylmethyl)-N,N',N'-trimethyl ethylene diammonium chloride,
hexamethylenebis(dimethylethylammonium)bromide,
hexamethylenebis(dimethylbutylammonium)chloride,
hexamethylenebis(methyldiethylammonium)acetate,
hexamethylenebis(triethylammonium)propionate,
1,1'-pentamethylenebis(1-methylpyrrolidinium)hydrogen tartrate,
trimethylene-bis(trimethylammonium)gluconate, and
ethylenebis (1-naphthylmethyl)-dimethylammonium chloride.

The outstanding results obtained with the compositions of this invention are not fully understood, nor is any theory offered to explain these results. However, a decrease in free fatty acid (non-esterified) fatty acid levels in the blood serum of animals on rations containing hexamethonium salts is noted relative to that of animals on rations containing no hexamethonium salts.

The following examples are given solely for the purpose of illustration and are not to be construed as limitations of this invention, many variations of which are possible without departing from the spirit or scope thereof.

EXAMPLE I

Three groups of weanling Sprague-Dawley rats, each group containing 5 male and 5 female rats, and a control group containing 10 rats of each sex are used in this experiment. The rats are individually housed in wire-bottom cages. Water and food are provided ad libitum throughout the 8-week experimental period.

The basal ration formulation used has the composition:

| Ingredient: | Percent |
|---|---|
| Corn meal | 61 |
| Soybean oil meal | 15 |
| Dried skim milk | 15 |
| Alfalfa meal | 2 |
| Stabilized animal fat | 3.5 |
| Steamed bone meal | 1 |
| Ground limestone | 1 |
| Salt-iodized | 0.9 |
| Delamix | 0.1 |
| Vitamin mix | 0.5 |
| | 100.0 |

Delamix is the trademark name for a trace mineral premix manufactured by The Limestone Products Corporation of America, Newton, N.J. and having the following composition:

| Ingredient: | Percent |
|---|---|
| Manganese | 12.0 |
| Iodine | 0.2 |
| Iron | 4.0 |
| Copper | 0.4 |
| Cobalt | 0.08 |
| Magnesium | 3.6 |

The central group is fed this basal ration. The three treatment groups are fed the basal ration to which hexamethonium chloride (HMT—Cl) is added at the expense of the corn meal in varying concentrations. The rats are weighed initially and thence every two weeks throughout the eight weeks of the experiment. Feed intakes are determined every other day.

The concentrations of hexamethonium chloride and the results obtained are tabulated below. The "Gains Index" is defined as:

$$\frac{\text{Average gain produced by the supplemented feed}}{\text{Average gain produced by the unsupplemented feed}} \times 100$$

The unsupplemented feed or control group is arbitrarily assigned a "Gains Index" of 100.

| Supplement | Avg. Gain gms./rat | Gains Index |
|---|---|---|
| None | 43.8 | 100 |
| HMT-Cl 0.002% | 66.6 | 152 |
| HMT-Cl 0.01% | 58.2 | 133 |
| HMT-Cl 0.05% | 64.1 | 146 |

It is obvious from this data that the addition of as little as 0.002% of hexamethonium chloride added to the animal's diet induces an appreciable increase in the rate at which weight is gained.

EXAMPLE II

Repetition of the procedure of Example I but using the following hexamethonium salts in place of the chloride produces comparable weight gains. Z represents the anion which replaces the chloride in Example I.

| Z: | No. of Z groups |
|---|---|
| Bromide | 2 |
| Gluconate | 2 |
| Acetate | 2 |
| Bisulfate | 2 |
| Butyrate | 2 |
| Caprate | 2 |
| Acid succinate | 2 |
| Acid maleate | 2 |
| Pamoate | 1 |
| Amsonate | 1 |
| Dihydrogen phosphate | 2 |
| Acid malonate | 2 |
| Acid glutarate | 2 |
| Acid adipate | 2 |
| Acid malate | 2 |
| Acid tartrate | 2 |
| Dihydrogen citrate | 2 |
| Tartrate | 1 |
| Formate | 2 |

Resinate-Amberlite IR-120 containing 8% HMT—Cl.

EXAMPLE III

Twenty 20-week-old Sprague-Dawley rats are divided into two groups, each group having 10 replications (rats). Replications are made by grouping the rats into groups of 5 of the same sex having the most similar initial weights. All rats have been on control rations for the 7-week period preceding the experiment.

The basal ration used has the composition:

| Ingredient: | Percent |
|---|---|
| Yellow corn | 56.6 |
| Soybean oil meal | 33.8 |
| Alfalfa meal | 2.0 |
| Stabilized animal fat | 3.5 |
| Salt, iodized | 0.5 |
| Mineral-vitamin mix [1] | 0.6 |
| Limestone | 1.0 |
| Dicalcium Phosphate | 2.0 |

[1] Trace mineral vitamin premix

Vitamin—5% of Feed

| | Percent of premix |
|---|---|
| Vitamin A-10 | 10 |
| Vitamin D$_3$-3000 | 10 |
| Choline chloride (25%) | 35.25 |
| Niacin (80%) | 0.55 |
| Calcium pantathentate (45%) | 10 |
| Riboflavin-4 | 0.39 |
| B-12 | 0.2 |
| Vigofac-6 | 30 |
| Fine corn meal | 3.75 |

Mineral mix—0.05% of Feed

| | |
|---|---|
| Manganese | 24.0 |
| Iodine | 0.48 |
| Iron | 8.0 |
| Copper | 0.8 |
| Zinc | 0.04 |
| Cobalt | 0.08 |

Vigofac is the registered trade mark of Chas. Pfizer & Co., Inc. for unidentified poultry and livestock growth factors obtainable from Streptomyces fermentation sources.

One group, the control group, is fed the basal ration to which hexamethonium bromide (HMT—Br) is added at the expense of the yellow corn. The rats are weighed initially and then at four weeks and at the end of the eight weeks of the experiment. Results are tabulated below.

| Supplement | Average Body Weight | | | Wk. | |
|---|---|---|---|---|---|
| | Initial (g.) | Wk. (g.) | 8 Wk. (g.) | Wt. Gain (g.) | Index |
| None | 236 | 260 | 268 | 24 | 100.0 |
| HMT-Br 0.01% | 241 | 285 | 289 | 44 | 182. |

| | 8 Wk. Average | | | |
|---|---|---|---|---|
| Male | Female Wt. | Gain | Index | |
| 45.8 | 17.2 | 31.5 | 100.0 | |
| 71.6 | 24.6 | 48.1 | 152.7 | |

A remarkable growth difference is evident. The significant sex treatment interaction is unexpected but real.

EXAMPLE IV

Seventy-two weaned pigs under 50 pounds of weight are assigned to 12 pens at the rate of 6 pigs per pen. Equal numbers of pigs of each sex are placed in each pen and the weight distribution of pigs in each pen is similar. The pigs are divided into 5 treatment groups, replicates of each group being used.

The weights of the individual pigs are taken at the start of the experiment and every two weeks through slaughter (14 weeks). Feed intake determinations coincide with the weighting periods. Dressing percentage and backfat thickness are determined at slaughter.

The basal rations and schedule therefor used throughout the experiment are presented below. The control group is fed the basal ration. The remaining groups are fed the basal ration to which the hexamethonium chloride (HMT—Cl) is added at the expense of the corn meal.

BASAL RATION

| | To 50 lbs. Normal | 50-125 lbs. Normal | 125 lbs. Up Normal |
|---|---|---|---|
| Ground Corn | 62.1 | 74.5 | 80.3 |
| Soybean Oil Meal (44%) | 20.0 | 12.0 | 8.0 |
| Dehydrated Alfalfa Meal (17%) | 3.0 | 3.0 | 3.0 |
| Dried Skim Milk | 8.0 | 4.0 | 2.0 |
| Fish Meal | 2.0 | 1.0 | 1.0 |
| Dibasic Sodium Phosphate (Anhydrous) | 0.87 | 1.19 | 1.30 |
| Ground Limestone | 1.31 | 1.63 | 1.72 |
| Premix* | 1.20 | 1.20 | 1.20 |
| Choice White Grease | 1.50 | 1.50 | 1.50 |
| Percent Protein | 18.68 | 14.30 | 12.34 |

*Premix.

| Ingredient: | | Amount in 100 lbs. feed |
|---|---|---|
| $FeSO_4$ | grams | 7.0 |
| $CuSO_4$ | do | 0.5 |
| $CoCl_3$ | do | 0.2 |
| $MnSO_4$ | do | 2.0 |
| $MgSO_4$ | do | 3.0 |
| $ZnCO_3$ | do | 2.0 |
| Iodized salt | do | 227.0 |
| Riboflavin | do | 0.4 |
| Pantothenic acid | do | 0.8 |
| Niacin | do | 1.8 |
| Choline chloride | do | 2.0 |
| Folic acid | mg | 0.12 |
| B-12 | mg | 0.02 |
| Vitamin A | I.U | 100,000 |
| Vitamin $D_3$ | I.U | 90,000 |
| Methionine D.L. | grams | 9.0 |
| Carrier to make up to 1.2 pounds. | | |

Pertinent information on the treatment groups and the results obtained through the 14 weeks of experiment are given below.

| Group | Replicates | Supplement | Average Gain (lbs.) | Gains Index | Feed Efficiency | |
|---|---|---|---|---|---|---|
| | | | | | Average | Index |
| 1 | 4 | None | 163.3 | 100 | 3.41 | 100 |
| 2 | 2 | HMT-Cl 0.002% | 167.2 | 102.3 | 3.30 | 103.3 |
| 3 | 2 | HMT-Cl 0.01 % | 161.7 | 99.0 | 3.49 | 97.7 |
| 4 | 2 | HMT-Cl 0.05% | 162.3 | 99.3 | 3.38 | 100.8 |

The "feed efficiency index" is defined as:

$$\frac{\text{Lbs. of feed per lb. of gain produced by unsupplemented feed}}{\text{Lbs. of feed per lb. of gain produced by supplemented feed}} \times 100$$

The unsupplemented feed or control is arbitrarily assigned a "feed efficiency index" of 100.

The carcass characteristics of these hogs are summarized in the following table.

CARCASS CHARACTERISTICS

| Group No. | Dressing Percentage | Backfat Thickness | Average Weight of Individual Primal Cuts | |
|---|---|---|---|---|
| | | | Ham | Picnic |
| 1 | 74.2 | 1.51 | 14.9 | 7.0 |
| 2 | 75.2 | 1.76 | 15.3 | 7.6 |
| 3 | 75.1 | 1.68 | 14.9 | 7.2 |
| 4 | 74.5 | 1.60 | 14.8 | 7.1 |

From the above data, hexamethonium chloride is seen to produce weight gain stimulation at a level of 0.002% of the diet. Higher concentrations produced no gain. However, all concentration levels studied favorably influenced the average weight of some of the individual cuts. The lowest level of supplement increased the yield of primal cuts.

EXAMPLE IV

Repetition of the procedure of Example III but replacing hexamethonium chloride with the following salts produces similar results. For convenience only the anion Z is listed.

| Z: | No. of Z |
|---|---|
| Bromide | 2 |
| Acetate | 2 |
| Isobutyrate | 2 |
| Valerate | 2 |
| Gluconate | 2 |
| Resinate-Amberlite IR-120 containing 8% HMT—Cl | |
| Dihydrogen citrate | 2 |
| Dihydrogen phosphate | 2 |
| Acid tartrate | 2 |
| Tartrate | 1 |
| Pamoate | 1 |

EXAMPLE V

In further tests, hexamethonium chloride is added to the standard balanced animal feed compositions normally given sheep, steers, goats, mink, and dogs at levels of from 0.002% to 0.05%. Each species is observed to undergo an acceleration in growth rate particularly at the lower levels of supplement used.

What is claimed is:

1. A quadruped animal feed composition comprising a nutritionally balanced animal feed and a minor growth-promoting portion of a compound having the formula $$[(CH_3)_3N-(CH_2)_6-N(CH_3)_3]^{+2}Z$$

wherein Z is a non-toxic anion and is present in sufficient molar proportion to satisfy electroneutrality.

2. A quadruped animal feed composition comprising a nutritionally balanced animal feed and from about 18 to about 500 g. per ton of feed of a compound having the formula $$[(CH_3)_3N-(CH_2)_6-N(CH_3)_3]^{+2}Z$$

wherein Z, a non-toxic anion, is present in sufficient molar proportion to satisfy electroneutrality and is selected from the group consisting of chloride, bromide, iodide, formate, gluconate, pamoate, amsonate and monovalent and divalent anions of maleic, fumaric, sulfuric, phosphoric acids, hydrocarbon mono- and polycarboxylic acids having from 2 to 6 carbon atoms and hydroxy-substituted hydrocarbon polycarboxylic acids having from 3 to 6 carbon atoms.

3. The composition of claim 2 in which Z is chloride.

4. The composition of claim 2 in which Z is bromide.

5. The composition of claim 2 wherein Z is the anion of a hydrocarbon monocarboxylic acid.

6. The composition of claim 2 in which Z is the anion of a hydroxy-substituted hydrocarbon polycarboxylic acid.

7. The composition of claim 6 wherein Z is the monovalent anion of tartaric acid.

References Cited

UNITED STATES PATENTS

| 2,899,357 | 8/1959 | Cavallito et al. | 167—55 |
| 3,092,496 | 6/1963 | Luther et al. | 99—2 |
| 3,178,340 | 3/1965 | Robison et al. | 99—2 X |

OTHER REFERENCES

Barber et al., Journal of Pharmacy and Pharmacology, vol. 3, pp. 663–69, 1951 (RS1 J 65).

A. LOUIS MONACELL, *Primary Examiner.*

H. H. KLARE, *Assistant Examiner.*